BUS DUCT HAVING PARTICULARLY SHAPED AND SPACED BUS BARS

Filed March 22, 1967

3 Sheets-Sheet 1

INVENTOR
LAWRENCE VINCENT

BY Paul J. Rose
ATTY.

INVENTOR.
LAWRENCE VINCENT

BY Paul J. Rose

ATTY.

BUS DUCT HAVING PARTICULARLY SHAPED AND SPACED BUS BARS

Filed March 22, 1967 3 Sheets-Sheet 3

INVENTOR.
LAWRENCE VINCENT

BY Paul J. Rose
ATTY.

United States Patent Office 3,472,946

Patented Oct. 14, 1969

3,472,946
BUS DUCT HAVING PARTICULARLY SHAPED AND SPACED BUS BARS

Lawrence Vincent, Lexington, Ky., assignor to Square D Company, Park Ridge, Ill., a corporation of Michigan Filed Mar. 22, 1967, Ser. No. 625,108
Int. Cl. H01b 7/08
U.S. Cl. 174—68 9 Claims

ABSTRACT OF THE DISCLOSURE

For use in feeder bus duct, an assembly of three flat, solid, flatwise-aligned, equally thick, closely spaced bus bars having particularly offset opposite end portions, the center bus bar having opposite end portions oppositely offset by one-half the thickness of the bus bar, and the outer two bus bars each having opposite end portions offset away from the center bus bar, one end portion being offset more than the other by the thickness of the bus bar, and the more offset end portion being disposed adjacent an end portion of the center bus bar offset in an opposite direction.

SUMMARY OF THE INVENTION

This invention relates to a bus bar assembly for use in feeder bus duct, the assembly including three flat, solid, flatwise-aligned, equally thick bus bars, the outer two bus bars, except for opposite end portions, each being spaced from the center bus bar by less than the thickness of one of the bus bars. The opposite end portions of the center bus bar are oppositely offset each by one-half the thickness of the bus bar, and the opposite end portions of each of the outer two bus bars are offset away from the center bus bar, one end portion of each outer bar being offset more than the other end portion by the thickness of the bus bar. The lesser offset end portion of each of the outer two bus bars is disposed adjacent an end portion of the center bus bar offset in the same direction, and the more offset end portion of each of the outer two bus bars is disposed adjacent an end portion of the center bus bar offset in an opposite direction.

DETAILED DESCRIPTION

Figure 1:
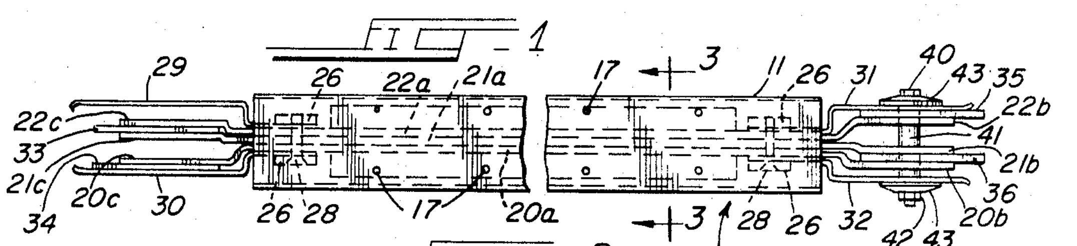
FIG. 1 is a top plan view of a section of feeder bus duct including an assembly of three bus bars constructed in accordance with the invention, an intermediate portion being broken away.
Figure 2:
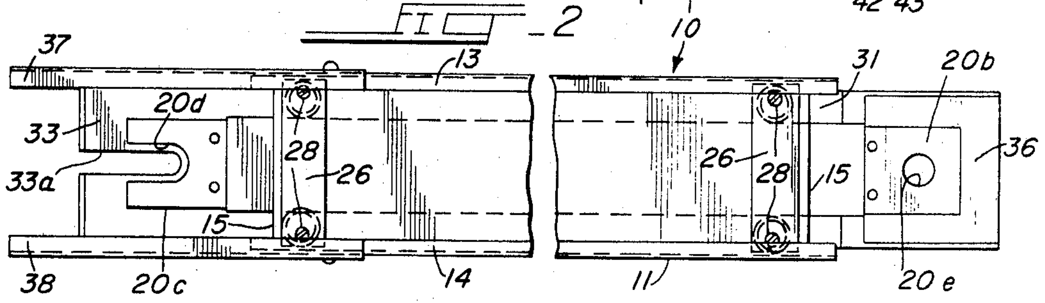
FIG. 2 is a side elevational view of the bus duct of FIG. 1, a pair of tie channels having been added to the left end portion and certain other parts being omitted for clarity.
Figure 3:
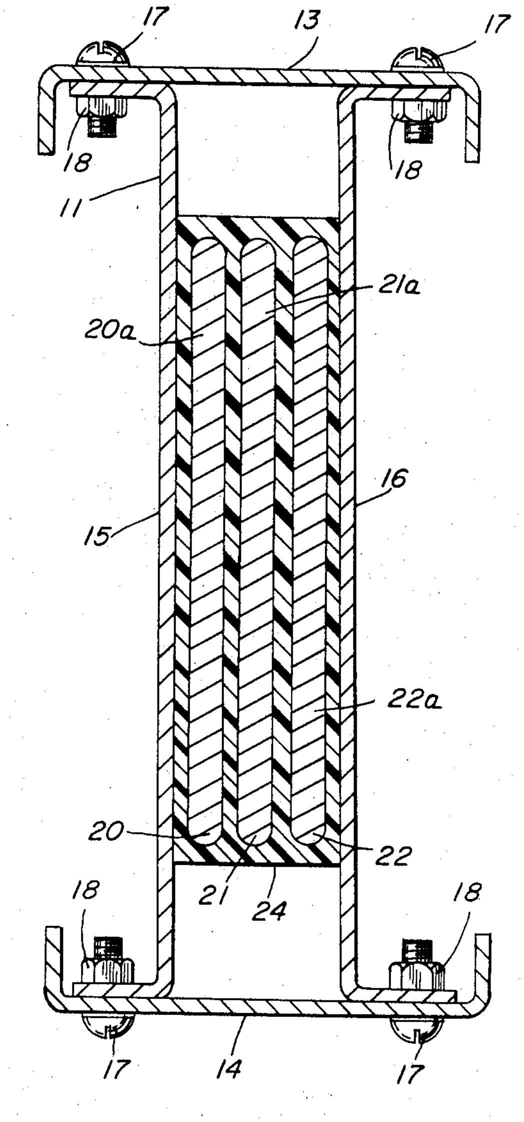
FIG. 3 is a sectional view taken along the line 3—3 of FIG. 1.

FIGS. 1 and 2 show a section of feeder bus duct 10 including a housing 11 having a bus bar assembly constructed in accordance with the invention mounted therein. As best shown in FIG. 3, the housing 11 includes a pair of identical top and bottom channel members 13 and 14 and a pair of identical side channel members 15 and 16, opposed side wall portions of each of the channel members 15 and 16 being secured respectively to the bottom wall portions of the channel members 13 and 14 by a plurality of screws 17 and associated nuts 18, and bottom wall portions of the channel members 15 and 16 being spaced closer together than the bottom wall portions of the channel members 13 and 14.

Three elongated generally flat bus bars 20, 21, and 22 of solid cross section and generally equal thicknesses are secured with respect to each other and to the bottom wall portions of the channel members 15 and 16 in any suitable manner, such as by an adhesive epoxy material 24, which also serves as insulation. The bus bars 20, 21, and 22 are flatwise aligned and respectively include straight, elongated intermediate portions **20*a*, 21*a*, and 22*a* (FIG. 1) forming the greater portions of the lengths of the bus bars and disposed within the housing 11 with their flat sides parallel to the bottom wall portions of the channel members 15 and 16. The center bus bar 21 includes a pair of opposite end portions 21*b* and 21*c* respectively offset in opposite directions from the intermediate portion 21*a* by one-half the thickness thereof. The outer bus bar 20 includes a pair of opposite end portions 20*b* and 20*c* offset from the intermediate portion 20*a* in a direction away from the center bus bar 21, the end portion 20*c* being offset more than the end portion 20*b* by the thickness of one of the bus bars. Similarly, the outer bus bar 22 includes a pair of opposite end portions 22*b* and 22*c* offset from the intermediate portion 22*a* in a direction away from the center bus bar 21, the end portion 22*b* being offset more than the end portion 22*c* by the thickness of one of the bus bars. The end portions 20*b* and 22*c*, the lesser offset end portions respectively of the outer bus bars 20 and 22, are disposed respectively adjacent the end portions 21*b* and 21*c* of the center bus bar 21 and offset respectively from their intermediate portions 20*a* and 22*a* in the same direction the end portions 21*b* and 21*c* are offset respectively from the intermediate portion 21*a*. The end portions 20*c* and 22*b*, the more offset end portions respectively of the outer bus bars 20 and 22, are disposed respectively adjacent the end portions 21*c* and 21*b* of the center bus bar 21 and offset respectively from their intermediate portions 20*a* and 22*a* in an opposite direction from the direction the end portions 21*c* and 21*b* are offset respectively from the intermediate portion 21*a*. The intermediate portions 20*a* and 22*a* respectively of the outer bus bars 20 and 22 are each spaced from the intermediate portion 21*a* of the center bus bar 21 by less than one-half the thickness of one of the bus bars and are spaced respectively from the bottom wall portions of the channel members 15 and 16 by less than one-half the thickness of one of the bus bars. For ease of representation, the spacing of the outer bus bars 20 and 22 from the center bus bar 21 and respectively from the channel members 15 and 16** as shown in FIG. 3 is greater than in actual practice.

Opposite end portions of the intermediate portions **20*a*, 21*a*, and 22*a* are clamped together respectively by pairs of clamping members 26 each pair of which is secured together by a pair of screws 28. The clamping members 26 also clamp opposite end portions of the bottom wall portions of the channel members 15 and 16. Further, the left-hand pair of clamping members 26, as viewed in FIG. 1, also clamp a pair of inner joint covers 29 and 30, while the right-hand pair of clamping members 26 also clamp a pair of outer joint covers 31 and 32**.

Four insulating members 33, 34, 35, and 36 are provided, the insulator 33 being trapped between the end portions **21*c* and 22*c*, the insulator 34 being trapped between the end portion 20*c* and the inner joint cover 30, the insulator 35 being trapped between the end potrion 22*b* and the outer joint cover 31, and the insulator 36 being trapped between the end portions 20*b* and 21*b***.

The end portions **20*c*, 21*c*, and 22*c* are slotted as shown at 20***d* for the end portion 20*c* in FIG. 2. The insulator 33 is slotted as shown at 33*a* in FIG. 2. The inner joint covers 29 and 30 and the insulator 34 are omitted in FIG. 2, but are similarly slotted.

A pair of upper and lower tie channels 37 and 38 are secured respectively to the left-hand end portions of the channel members 13 and 14, as shown in FIG. 2, the tie channels 37 and 38 being omitted in FIG. 1 and in FIGS. 3 through 6.

The end portions 20*b*, 21*b*, and 22*b* are provided with circular holes as shown at 20*e* for the end portion 20*b* in FIG. 2. The outer joint covers 31 and 32 and the insulators 35 and 36 are provided with similar holes, the outer joint cover 32 being omitted in FIG. 2.

A bolt 40 and an insulating sleeve 41 therefor are mounted in the end portions 20*b*, 21*b*, and 22*b*, and extend through the holes such as the hole 20*e*. A nut 42 and a pair of spring washers 43 are also mounted on the bolt 40. These parts are omitted in FIG. 2.

Figure 4:
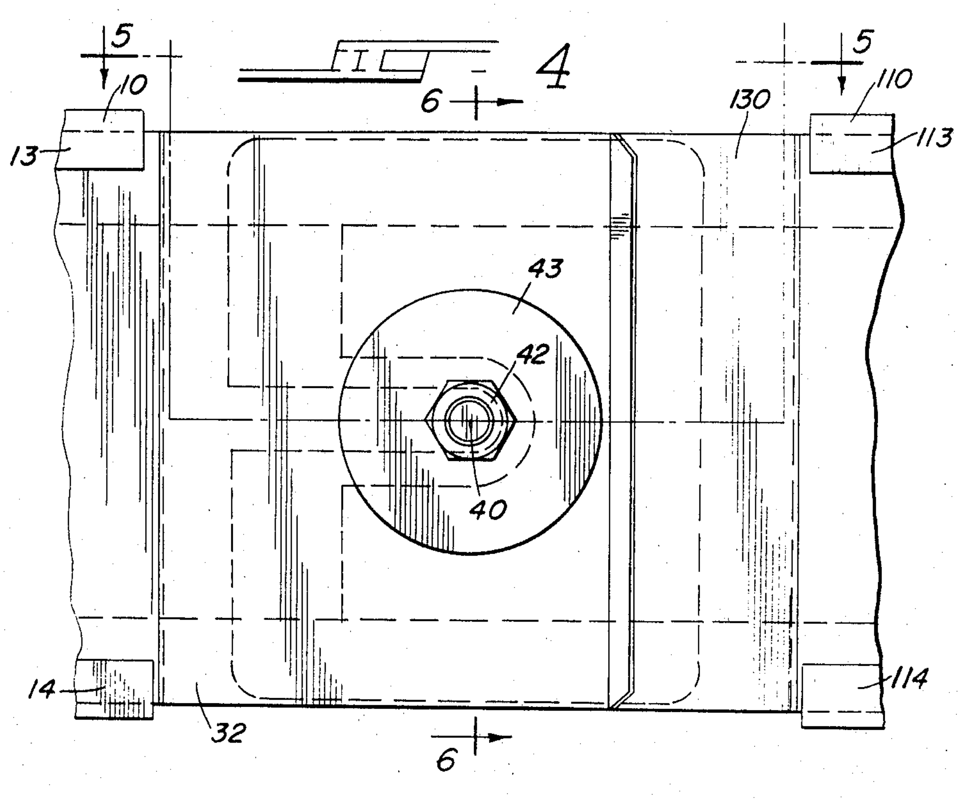
FIG. 4 is a side elevational view of a joint between the section of feeder bus duct of FIG. 1 and an identical section of feeder bus duct, the tie channels being omitted.
Figure 5:
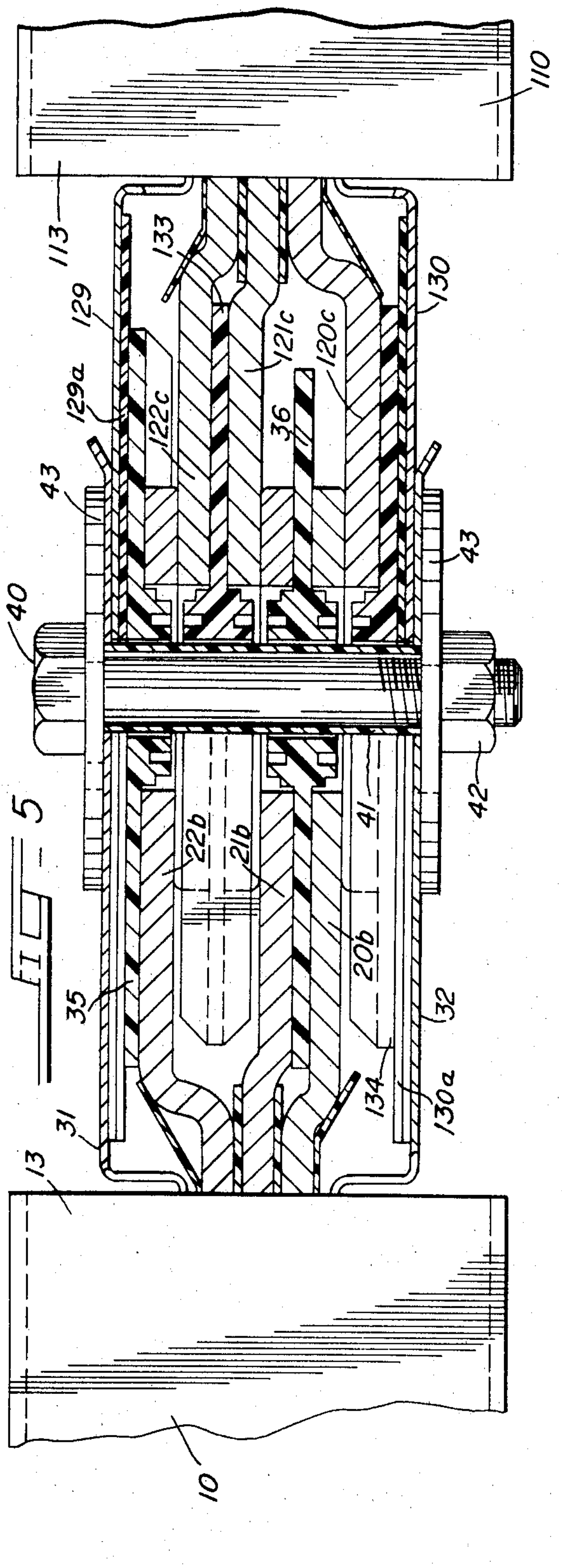
FIG. 5 is a fragmentary sectional view taken along the line 5—5 of FIG. 4.
Figure 6:
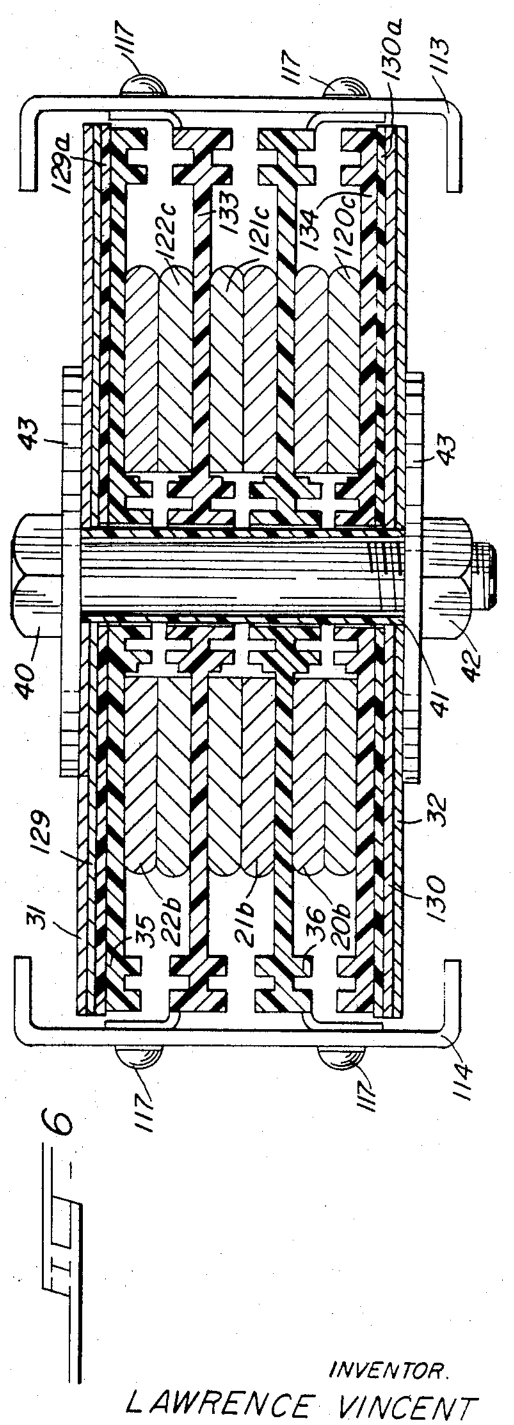
FIG. 6 is a cross sectional view through the joint taken along the line 6—6 of FIG. 4.

FIGS. 4, 5, and 6 show a joint between the section of feeder bus duct 10 and an identical section of feeder bus duct 110, the parts of the bus duct 110 being identified by numerals one hundred higher than the numerals of corresponding parts of the bus duct 10.

Two additional insulators, not shown in FIG. 1, are secured respectively to the inner surfaces of the inner joint covers 29 and 30, and are identical to the insulators 129*a* and 130*a* (FIGS. 5 and 6) of the bus duct 110.

I claim:

1. An assembly comprising three elongated generally flat bus bars of solid cross section and substantially equal thicknesses, said bus bars being flatwise aligned, two outer bus bars of said three bus bars being disposed respectively on opposite sides of a center bus bar of said three bus bars and secured with respect thereto, each of said bus bars having an elongated intermediate portion and a pair of offset opposite end portions, the intermediate portion of each of said outer bus bars being spaced from the intermediate portion of said center bus bar less than the thickness of one of said bus bars, the opposite end portions of said center bus bar respectively being offset substantially one-half the thickness of one of said bus bars in opposite directions from the intermediate portion of said center bus bar, the opposite end portions of each of said outer bus bars being offset from the intermediate portion thereof in a direction away from said center bus bar, one end portion of each of said outer bus bars being offset more than the other end portion thereof by substantially the thickness of one of said bus bars, a lesser offset end portion of each of said outer bus bars being disposed adjacent an end portion of said center bus bar offset in the same direction, and a more offset end portion of each of said outer bus bars being disposed adjacent an end portion of said center bus bar offset in an opposite direction.

2. An assembly as claimed in claim 1, wherein the intermediate portion of each of said outer bus bars is spaced from the intermediate portion of said center bus bar less than one-half the thickness of one of said bus bars.

3. An assembly as claimed in claim 1, and an elongated housing substantially enclosing said intermediate portions of said bus bars, said housing including a first pair of housing members providing a first pair of spaced generally parallel wall portions having said intermediate portions of said bus bars disposed therebetween and a second pair of housing members secured to said first pair of housing members and providing a second pair of spaced generally parallel wall portions having said intermediate portions of said bus bars disposed therebetween, said second pair of wall portions being disposed between and extending generally perpendicularly to said first pair of wall portions to define an enclosure for said intermediate portions of said bus bars therewith and being spaced closed together than said first pair of wall portions, said bus bars being secured with respect to said housing, and said intermediate portions of said bus bars having flat sides disposed generally parallel to said second pair of wall portions.

4. An assembly as claimed in claim 3, wherein the intermediate portion of each of said outer bus bars is spaced from the intermediate portion of said center bus bar less than one-half the thickness of one of said bus bars.

5. An assembly as claimed in claim 3, wherein said second pair of wall portions are spaced respectively from said intermediate portions of said outer bus bars less than the thickness of one of said bus bars.

6. An assembly as claimed in claim 3, wherein said second pair of wall portions are spaced respectively from said intermediate portions of said outer bus bars less than one-half the thickness of one of said bus bars.

7. An assembly as claimed in claim 3, wherein the intermediate portion of each of said outer bus bars is spaced from the intermediate portion of said center bus bar less than one-half the thickness of one of said bus bars and said second pair of wall portions are spaced respectively from said intermediate portions of said outer bus bars less than the thickness of one of said bus bars.

8. An assembly as claimed in claim 3, wherein the intermediate portion of each of said outer bus bars is spaced from the intermediate portion of said center bus bar less than one-half the thickness of one of said bus bars and said second pair of wall portions are spaced respectively from said intermediate portions of said outer bus bars less than one-half the thickness of one of said bus bars.

9. An assembly comprising three elongated generally flat bus bars of solid cross section and substantially equal thicknesses, said bus bars being flatwise aligned, two outer bus bars of said three bus bars being disposed despectively on opposite sides of a center bus bar of said three bus bars and secured with respect thereto, each of said bus bars having an elonagted intermediate portion and a pair of offset opposite end portions, the intermediate portion of each of said outer bus bars being spaced from the intermediate portion of said center bus bar less than the thickness of one of said bus bars, the opposite end portions of said center bus bar respectively being offset substantially one-half the thickness of one of said bus bars in opposite directions from the intermediate portion of said center bus bar, the opposite end portions of each of said outer bus bars being offset from the intermediate portion thereof in a direction away from said center bus bar, one end portion of each of said outer bus bars being offset more than the other end portion thereof by substantially the thickness of one of said bus bars, and said outer bus bars being reversed end-to-end from each other.

References Cited

UNITED STATES PATENTS

| | | |
|---|---|---|
| 2,350,601 | 6/1944 | Frank et al. |
| 3,187,086 | 6/1965 | Moodie et al. |
| 3,189,680 | 6/1965 | Stanback. |
| 3,365,537 | 1/1968 | Fehr et al. |
| 3,383,458 | 5/1968 | Raskhodoff et al. |
| 3,408,454 | 10/1968 | Fouse. |

DARRELL L. CLAY, Primary Examiner

U.S. Cl. X.R.

174—88, 99